United States Patent [19]

Aishima et al.

[11] 4,242,251

[45] Dec. 30, 1980

[54] COMPOSITION COMPRISING A THERMOPLASTIC RESIN AND MINERAL FILLER PARTICLES COATED WITH AN ETHYLENICALLY UNSATURATED ORGANIC ACID, THE ETHYLENIC DOUBLE BONDS OF WHICH REMAIN SUBSTANTIALLY UNREACTED; PRODUCT RESULTING FROM CAUSING SAID TO REACT

[75] Inventors: Itsuho Aishima, Fujisawa; Junji Seki, Tokyo; Koichi Matsumoto, Kurashiki; Yonemasa Furusawa, Amagasaki; Ryogo Tsukisaka, Takarazuka; Yuhachi Takahashi, Amagasaki, all of Japan

[73] Assignees: Asahi Kasei Kogyo Kabushiki Kaisha, Osaka; Shiraishi Central Laboratories Co., Ltd., Hyogo, both of Japan

[21] Appl. No.: 61,095

[22] Filed: Jul. 26, 1979

Related U.S. Application Data

[63] Continuation-in-part of Ser. No. 923,885, Jul. 12, 1978, abandoned, which is a continuation of Ser. No. 867,260, Jan. 5, 1978, abandoned, which is a continuation of Ser. No. 581,460, May 28, 1975, abandoned.

[30] Foreign Application Priority Data

May 28, 1974 [JP] Japan .................................. 49-59377

[51] Int. Cl.³ ........................... C08J 3/20; C08K 3/34; C08K 9/04; C09C 1/40; C09C 3/08

[52] U.S. Cl. .................. 260/37 N; 106/308 Q; 260/40 R; 260/42.14; 260/42.44; 260/42.55; 428/404; 428/407; 525/12; 525/254; 525/411; 525/426; 525/455

[58] Field of Search ................ 260/42.14, 37 N, 40 R; 428/404, 407; 525/12, 254, 411, 426, 455

[56] References Cited

U.S. PATENT DOCUMENTS

| 3,190,870 | 6/1965 | Elkins | 260/42.14 |
|---|---|---|---|
| 3,304,197 | 2/1967 | Pundsack | 260/42.14 |
| 3,471,439 | 10/1969 | Bixler | 260/42.14 |
| 3,694,403 | 9/1972 | Aishma et al. | 260/42.14 |
| 3,773,708 | 11/1973 | Takahashi | 260/42.14 |
| 4,129,549 | 12/1978 | Kahone | 260/40 R |
| 4,151,136 | 4/1979 | Cornell | 260/42.14 |

*Primary Examiner*—James C. Cannon
*Attorney, Agent, or Firm*—Sprung, Felfe, Horn, Lynch & Kramer

[57] ABSTRACT

A composition comprising a thermoplastic resin and an activated mineral filler, said mineral filler consisting of particles of at least one aluminosilicate-type mineral containing alakali metal ions as cations in its crystal structure, the surfaces of said particles being covered monomolecularly with at least one ethylenically unsaturated organic acid, having 10 or less carbon atoms, which is bonded to the metal ions on the surfaces of said particles and retains ethylenic double bonds unreacted. On being mixed under application of heat to cause reaction, this composition gives a molded article excellent in compatibility and physical properties such as stiffness, toughness, ductility, fatigue properties, water resistance, transparency, etc.

23 Claims, No Drawings

COMPOSITION COMPRISING A THERMOPLASTIC RESIN AND MINERAL FILLER PARTICLES COATED WITH AN ETHYLENICALLY UNSATURATED ORGANIC ACID, THE ETHYLENIC DOUBLE BONDS OF WHICH REMAIN SUBSTANTIALLY UNREACTED; PRODUCT RESULTING FROM CAUSING SAID TO REACT

This is a continuation-in-part of Application Ser. No. 923,885, filed July 12, 1978, now abandoned, which is a continuation of 867,260, filed Jan. 5, 1978, now abandoned, which is a continuation of Application Ser. No. 581,460, filed May 28, 1975, now abandoned.

This invention relates to a composite comprising a mineral-based activated filler consisting principally of a specially treated aluminosilicate mineral and a thermoplastic resin. On being mixed under application of heat and then molded, the said composition can provide a useful molded article which is markedly improved, above all, in toughness, moisture resistance, fatigue properties, and transparency.

There have heretofore been known inorganic fillers such as silica, clay, talc, calcium carbonate, gypsum, aluminum hydroxide, and the like, which are used by mixing with various organic substances such as thermoplastic resins, thermosetting resins, rubbers, etc. When these inorganic fillers are mixed with organic substances, however, although the articles molded from such compounded compositions are improved in stiffness, hardness, and creep resistance, there are disadvantages of marked decrease in toughness and ductility owing to poor compatibility and for other reasons. Particularly when thermoplastic resins are filled with such inorganic fillers, the articles molded from the resulting compounds become too low in impact resistance and elongation to be of practical use, and also so much decreased in fatigue properties as compared with the unfilled resin that the articles are entirely unsuitable for use in functional elements which are subjected to repeated stress cycles.

Although there are known various ways which are proposed to improve the aforesaid disadvantages and to impart favorable dispersibility and reinforcing property to the inorganic fillers by surface treatment, for example, with surfactants, higher fatty acids or metal salts thereof, the improvement achieved is only partial in dispersibility and so slightly in reinforcing property that it is unworthy to be called an improvement.

Some of the present inventors already found that an reactive filler having novel characteristics is obtained by reacting a powdered inorganic substance selected from carbonates, hydroxides, and oxides of metals of Groups II and III of the Periodic Table with an organic acid while removing the evolved water, and proposed a process for producing a resin composite excellent in mechanical, thermal, and other properties by mixing a thermoplastic resin with said reactive filler (West German Patent Publication No. 2,262,126). Although the resin composition of said invention is markedly improved in toughness and ductility, the improvement in fatigue properties is not sufficient enough for the composition to be used without difficulty in functional mechanical parts. Further said resin composition is not so excellent in transparency as the resin composition of the present invention. The resin composition, in addition, is not satisfactorily improved in the lowering of physical properties by absorption of water, which tendency is, in general, common to resin compositions containing inorganic fillers in high concentrations.

The composition deisclosed in U.S. Pat. No. 3,304,197 is improved in the compatibility but insufficient in toughness, ductility, fatigue properties comparing with the composition of the present invention. The composition disclosed in U.S. Pat. No. 3,694,403 is improved in both transparency and toughness but insufficient in the surface state of the molded articles and water resistance comparing with the composition of the present invention.

An object of this invention is to improve the disadvantages of the prior art and to provide a composition comprising a resin and an activated inorganic filler capable of yielding a molded article excellent in stiffness, toughness, and ductility and, at the same time markedly improved in fatigue properties, water resistance, and, sometimes transparency.

Other objects and advantages of this invention will become apparent from the following description.

The present invention provides a composition comprising a thermoplastic resin and an activated mineral filler, said mineral filler consisting of particles of at least one aluminosilicate-type mineral containing alkali metal ions as cations in its crystal structure, the surfaces of said particles being covered monomolecularly with at least one ethylenically unsaturated organic acid, having 10 or less carbon atoms, which is bonded to the metal ions on the surfaces of said particles and retains ethylenic double bonds unreacted.

The mineral substance used as a raw material to obtain the activated mineral filler, which is one of the components of the present composition, is an aluminosilicate-type mineral containing, as cations in its crystal structure, alkali metal ions such as lithium, potassium, or sodium. Examples of these aluminosilicate-type minerals are $K_2O$—$Al_2O_3$—$SiO_2$-type minerals such as orthoclase, leucite, kalisilite, sanidine, and microline; $Na_2O$—$Al_2O_3$—$SiO_2$-type minerals such as albite, jadeite, nepheline, zeolite, carnegieite, soda-orthoclase and sodalite; and $Li_2O$—$Al_2O_3$—$SiO_2$-type minerals such as spodumene, petalite, and eucryptite. These minerals can be used either alone or as a mixture of two or more of them. Also can be used are various minerals polymorphous to those mentioned above such as carnegieite which is a polymorph of nepheline, and, further, various berthollide compounds such as plagioclase formed by isomorphous substitution of the alkali metal partially with an alkaline earth metal. The crystal structure of these minerals can be either the three-dimensional network type or the lamellar type. These minerals can either be natural ones or synthetic ones. The aluminosilicate content of the minerals to be used is preferably 50% or more, more preferably 80% or more. If the aluminosilicate content is low, the surprising advantages of the present invention can no longer be expected.

In order to exhibit the advantages of this invention to full extent, the average particle diameter of the powdered aluminosilicate mineral is preferably in the range of from 0.01 to 50μ, more preferably from 0.1 to 20μ.

The organic acids to be used in the present mineral filler are unsaturated carboxylic acids having one or more ethylenic double bonds, one or more carboxyl groups, and 10 or less carbon atoms. Examples of such ethylenically unsaturated organic acids include acrylic acid, α- and/or β-substituted derivatives thereof such as methacrylic acid, crotonic acid, angelic acid, cinnamic acid, sorbic acid, and α-chloroacrylic acid; maleic acid, fumaric acid, itaconic acid, citraconic acid, aconitic acid, vinylacetic acid, and allylacetic acid. In the present invention, short chain carboxylic acids are preferred, and particularly acrylic acid and methacrylic acid are effective. The said organic acids can be used alone or as a mixture of two or more of them. It is also possible to use an acid anhydride as a precursor of ethylenically unsaturated organic acid, which is converted into the corresponding acid in the reactant mixture.

In the present invention, it is necessary to react the ethylenically unsaturated organic acid with the powdered mineral so that a strong bond may be formed between the acid and the metal ion on the surface of said mineral particle, while retaining the ethylenic double bond unreacted.

The amount of the ethylenically unsaturated organic acid to be used is that necessary to cover uniformly the surface of each particle of the powdered mineral with substantially monomolecular thickness. More precisely, it is sufficient to cover, in a thickness of 2 to 20 Å, the surface of the mineral particle, as roughly calculated from the results of specific surface area measurement by the BET method. For example, a suitable amount of the organic acid per 100 parts by weight of the powdered minerals is 20 to 0.6 part by weight for the specific surface area of 100 to 30 m$^2$/g, 6 to 0.2 part by weight for 30 to 10 m$^2$/g, and 2 to 0.01 part by weight for 10 to 0.5 m$^2$/g. When an excess of the ethylenically unsaturated organic acid is used in the reaction for treating the powdered mineral, the free organic acid or its derivative remaining on the surface of mineral particles is not necessarily detrimental to the advantages of this invention. If, however, there is possibility of giving decreased thermal stability or deteriorated appearance of the articles formed from a composition compounded of such an activated filler, the free organic acid or its derivative can be removed, as mentioned later, by washing or other treatments.

Properties of the substantially monomolecularly formed layer are explained in detail below. When the activated mineral filler is suspended in water in liquid form, the ethylenically unsaturated organic acid derivative forming the layer is detached from the surface of the filler and extracted with water. This suggests that the bond between the organic acid and the metal on the filler surface is an ionic one which can be dissociated in water. The residual filler obtained by extracting with water exhibits, of course, no greater reinforcing effect than that of an untreated filler.

On the other hand, it is very difficult or even impossible under moderate conditions to detach the layer from the surface of the activated mineral filler by extraction with an anhydrous nonaqueous solvent which dissolves a free ethylenically unsaturated organic acid and a free metal salt of the ethylenically unsaturated organic acid. This means that the bond between the monomolecularly formed layer and the filler surface cannot be freed easily but rather by ionic dissociation with water.

The explanation given above may be substantiated experimentally by the determination of the metal ion concentration in an extract solution by chelatometric titration or by the determination of the ethylenic double bond concentration in an extract solution by the bromide-bromate method. It is also possible to prove the presence of ethylenic double bond on the surface of an activated mineral filler by IR spectrometry. From the shift of absorption band of the carbonyl group in IR absorption spectrum it is proved that the ethylenically unsaturated organic acid forms a strong bond with the metal ion on the filler surface; the absorption band of the carbonyl group in a free ethylenically unsaturated organic acid appears near 1700 cm$^{-1}$, whereas the absorption band of the carbonyl group in an activated mineral filler shows a shift to a lower wave number of 1600 cm$^{-1}$ or even lower.

The activated mineral filler of this invention can be manufactured in several ways. One of the methods consists in reacting one or more aforesaid powdered minerals with one or more aforesaid organic acids in a proportion in the aforesaid range in a mixing equipment under the conditions which permit efficient dehydration. Various common mixers for powdery materials can be used, and a high-efficiency mixer such as a Henschel mixer, a muller mixer, or a ribbon blender is particularly preferred. In order to increase the efficiency of contact between the powdered mineral and the organic acid, it is desirable to feed in the latter in the form of spray, though it can be added in vapor form.

The reaction can be carried out under atmospheric or superatmospheric pressure or reduced pressure. In any of the cases, the reaction must be conducted in the absence of water in the liquid form. If the reaction is carried out in the presence of excess water in liquid form, the desired activated mineral filler cannot be obtained.

The reaction can be carried out at any temperature in the range from room temperature to the decomposition temperature of the ethylenically unsaturated organic acid, but preferably, in general, at 50° to 200° C. The reaction time is generally 1 minute to 2 hours, but most frequently in the range from 5 to 30 minutes. In order to keep the ethylenically organic acid or its salt from polymerization, it is preferable to select adequately the reaction atmosphere (air or oxygen atmosphere is preferable in the case of acrylic acid) or to add preveously a polymerization inhibitor to the ethylenically unsaturated organic acid. The polymerization inhibitors suitable for use are those which have been in customary use, such as hydroquinone, methoxyhydroquinone, p-benzoquinone, naphthoquinone, and tert-butylcatechol, and the recommendable amount to be added is 0 to 1% by weight, particularly 0.02 to 0.5% by weight based on the ethylenically unsaturated organic acid.

Another method for manufacturing the activated mineral filler comprises reacting the powdered mineral and an excess of the ethylenically unsaturated organic acid in the same manner as in the above-mentioned method, washing the reaction product with a nonaqueous solvent which dissolves the ethylenically unsaturated organic acid and the salt thereof, then filtering and drying to give a purified product. The solvents suitable for use in this method are low-boiling solvents such as methanol, ethanol, propanol, diethyl ether, acetone, methyl ethyl ketone, and ethyl acetate.

A further method for manufacturing the activated mineral filler comprises mixing with stirring a thoroughly dried powdered mineral and ethylenically unsaturated organic acid in a nonpolar solvent such as benzene, toluene, xylene, hexane, heptane, tetralin, decalin, chloroform, and carbon tetrachloride. The reaction product is purified by filtering, washing with an aforesaid polar solvent, and drying.

The activated mineral filler thus obtained is mixed with various thermoplastic resins.

The thermoplastic resins for use as a component of the present composition include, for example, polyolefins such as high-density polyethylene, medium- and low-density polyethylenes, crystalline polypropylene, crystalline ethylene-propylene block copolymer, polybutene, and poly-4-methylpentene-1; polyvinyl chloride, polyvinylidene chloride, polystyrene, polymethyl methacrylates; polyamides, polyacetals, linear polyesters, polyurethanes, ABS resins, mixtures thereof; and blends of said polymers with elastomers.

The compounding of the above-listed matrix resins with the present activated mineral filler can be carried out in conventionally known ways. For example, the thermosplastic resin is preferably melt-mixed with the activated mineral filler so that the polymer radical formed during the melt-mixing may combine with the ethylenic double bond retained on the surface of the activated mineral filler. Accordingly, in order to accelerate the reaction more effectively, it is recommendable to add 0.001 to 0.1% by weight (based on the compounded composition) of free radical generating compounds including organic peroxides such as dicumyl peroxide and 2.5-dimethyl-2,5-di-(tert-butylperoxy)hexane, azo compounds such as azobisisobutyronitrile, and organotin (IV) compounds such as dibutyltin oxide.

The proportion of the amount of activated mineral filler to the thermoplastic resin in the composition can be very high up to nearly a level of closest packing. The compounding ratio should be selected in accordance with the intended use and required performance of the composition. The composition with desirable balance of performance characteristics is obtained when the composition contains 20 to 80% by weight of the thermoplastic resin and 80 to 20% by weight of the activated mineral filler, more preferably 40 to 70% by weight of the former and 60 to 30% by weight of the latter.

The present composition compounded of the activated mineral filler may contain, if necessary, one or more other additives such as stabilizers, UV absorbers, plasticizers, lubricants, cross-linking agents, cross-linking accelerators, pigments, fire retardants, antistatics, thickening agents, blowing agents, and the like.

The invention is illustrated below in further detail with reference to Examples and Referential Examples, but the invention is not limited to these examples. All parts in Examples and Referential Examples are by weight.

EXAMPLE 1

"Masuda" feldspar (chemical composition: 65.06% $SiO_2$, 18.16% $Al_2O_3$, 12.18% $K_2O$, 3.31% $Na_2O$, 1.29% others) from Shimane Prefecture, Japan, was ground to obtain a powdered mineral having an average particle diameter of 2.5μ, a BET specific surface area of 3 $m^2/g$, and a moisture content of 0.1%. To 100 parts of the powdered mineral charged in a Henschel mixer, while being heated at 150° C. and agitated, was added gradually from a spray feeder 0.5 part of acrylic acid, which contained 500 ppm of hydroquinone, in the form of mist. An activated mineral filler was obtained after 30 minutes of mixing under atmospheric pressure. A part of the activated mineral filler was thoroughly extracted with water. The aqueous extract was analyzed for determining the ethylenic double bond content by the bromide-bromate titration method and found to contain 0.45 part of an acrylic acid derivative in terms of acrylic acid. The residual filler contained no detectable acrylic radical. On the other hand, a part of the activated mineral filler was thoroughly extracted with diethyl ether and the extract solution was again extracted with water. The aqueous extract contained no detectable free acrylic acid beyond the limit of detection, as tested by titration with sodium hydroxide.

A premix was prepared from 50 parts of the activated mineral filler obtained as metioned above, 50 parts of powdery high-density polyethylene having a melt index of 5.0 and a density of 0.97, and 0.01 part of 2,5-dimethyl-2,5-di(tert-butylperoxy)hexane as a free radical generating agent. The premix was melt-mixed in a Banbury mixer at a resin temperature of 220° C. for 3 minutes, then sheeted by means of a two-roll mill, and pelletized. The resin composition thus obtained was fabricated into test specimens conforming to the specifications of ASTM testing methods, by means of a 5-oz injection molder at a resin temperature of 250° C. and a mold temperature of 80° C.

Evaluation of physical properties of the resin composition was conducted in accordance with ASTM testing methods. Evaluation of fatigue properties was conducted by use of a repeated-constant-stress-type vibration fatigue tester (made by Toyo Seiki Co.). In the accompanying drawing, are shown S-N curves for the resin compositions obtained in Example 1 and Referential Example 1. In the drawing, S means stress and N means number of cycles to failure and the S-N curves 1, 2, 3 and 4 correspond to the compositions of Example 1, Referential Examples 1—1, 1-2 and 1-3, respectively.

REFERENTIAL EXAMPLE 1—1

A resin composition was prepared and evaluated in the same manner as in Example 1, except that the untreated mineral powder obtained from the "Masuda" feldspar was used in place of the activated mineral filler.

REFERENTAIL EXAMPLE 1-2

In a manner similar to that in Example 1, 100 parts of ground calcium carbonate (2.5μ average particle diameter, 2.5 $m^2/g$ BET specific surface area, 0.1% moisture content) and 1 part of the same acrylic acid as used in Example 1 were mixed and heated to allow the reaction to proceed. The water vapor and carbon dioxide liberated during the reaction were removed from the reaction system.

A resin composition was prepared and evaluated in the same manner as in Example 1, except that the reactive filler obtained as mentioned above was used in place of the activated mineral filler.

REFERENTIAL EXAMPLE 1-3

The high-density polyethylene used in Example 1 was evaluated in the same manner as in Example 1.

Results obtained were as shown in Table 1.

TABLE 1

|  | Tensile strength $kg/cm^2$ | Elongation % | Flexural strength $kg/cm^2$ | Flexural modulus $kg/cm^2$ | Izod impact strength kg . cm/cm | Fatigue strength $kg/cm^2$ |
| --- | --- | --- | --- | --- | --- | --- |
| Example 1 Referential | 380 | 14 | 550 | 40000 | 14 | 180 |

TABLE 1-continued

|  | Tensile strength kg/cm$^2$ | Elongation % | Flexural strength kg/cm$^2$ | Flexural modulus kg/cm$^2$ | Izod impact strength kg . cm/cm | Fatigue strength kg/cm$^2$ |
|---|---|---|---|---|---|---|
| Example 1-1 | 210 | 1 | 270 | 42000 | 2 | 30 |
| Referential Example 1-2 | 390 | 8 | 510 | 42000 | 11 | 110 |
| Referential Example 1-3 | 310 | >100 | 330 | 13900 | 6 | 60 |

Note:
Testing methods
Tensile strength: ASTM D 638
Elongation: ASTM D 638
Flexural strength: ASTM D 790
Flexural modulus: ASTM D 790
Izod impact strength: notched specimen, ASTM D 256
Fatigue strength: Maximum stress under which no fatigue failure occurs after 10$^7$ cycles of repeated flexure; ASTM D 671 Method B, Type I specimen, temperature 20° C., speed of vibration, 1800 rpm.

EXAMPLE 2

Nepheline-syenite (chemical composition: 61.0% SiO$_2$, 23.3% Al$_2$O$_3$, 9.8% Na$_2$O, 4.6% K$_2$O, 1.3% others) from Ontario, Canada was grounded to obtain a powdered mineral having an average particle diameter of 4.5μ, a BET specific surface area of 1.4 m$^2$/g, and a moisture content of 0.1%. In the same manner as in Example 1, 100 parts of the powdered mineral and 0.3 part of the same acrylic acid as used in Example 1 were mixed and heated to allow the reaction to proceed to obtain an activated mineral filler. It contained 0.27 part of an acrylic acid derivative in terms of acylic acid, as determined by the bromide-bromate titration method in the same manner as in Example 1. On the other hand, a part of the activated mineral filler was thoroughly extracted with diethyl ether, and the extract solution was again extracted with water. The aqueous extract contained no detectable free acrylic acid beyond the limit of detection as tested by titration with sodium hydroxide.

A premix was prepared from 40 parts of the activated mineral filler and 60 parts of nylon 6,6 pellets having number-average molecular weight of 24,000. The premix was extruded from an extruder at a resin temperature of 285° C. and pelletized. The resin composition thus obtained was injection-molded at a resin temperature of 285° C. and a mold temperature of 80° C. to obtain test specimens. The specimens were evaluated in the same manner as in Example 1. The results obtained were as shown in Table 2. To evaluate the water resistance, test specimens were immersed in water at 23° C. for 100 hours, and the water absorption (percentage increase in weight) and the flexural strength were determined.

REFERENTIAL EXAMPLE 2-1

A resin composition was prepared and evaluated in the same manner as in Example 2, except that the untreated mineral powder obtained from the nepheline-syenite was used as such in place of the activated mineral filler.

REFERENTIAL EXAMPLE 2-2

The nylon 66 used in Example 2 was evaluated in the same manner as in Example 2.

TABLE 2

|  | Tensile strength* kg/cm$^2$ | Elongation* % | Flexural strength* kg/cm$^2$ | Flexural modulus kg/cm$^2$ | Izod Impact strength* kg . cm/cm | Fatigue strength* kg/cm$^2$ | Water resistance ** | |
|---|---|---|---|---|---|---|---|---|
|  |  |  |  |  |  |  | Water absorption, % | Flexural strength kg/cm$^2$ |
| Example 2 | 930 | 4 | 1400 | 58000 | 4 | 410 | 1.0 | 1150 |
| Referential Example 2-1 | 850 | 1 | 1100 | 57000 | 2 | 210 | 1.2 | 790 |
| Referential Example 2-2 | 890 | 17 | 1250 | 32000 | 4 | 220 | 2.2 | 720 |

Note:
*Specimens dry, as molded.
**Specimens immersed in water at 23° C. for 100 hrs.

EXAMPLE 3

The nepheline-syenite used in Example 2 had a refractive index (n$_D$) of 1.53 and there was available a high-density polyethylene having a refractive index (n$_D$) of 1.53, a melt index of 1.0, and a density of 0.953.

A premix was prepared from 50 parts of the activated mineral filler obtained in Example 2, 50 parts of the said high-density polyethylene, and 0.01 part of the same free-radical generating agent as used in Example 1. The premix was melt-mixed in a Banbury mixer at a resin temperature of 220° C. for 3 minutes, then sheeted by means of a two-roll mill, and pelletized. The resin composition thus obtained was compression-molded to prepare test specimens in accordance with ASTM testing methods. The test specimens were evaluated for physical properties in the same manner as in Example 1.

A piece of film, 100μ in thickness, was formed by compression molding from the resin composition obtained as mentioned above and tested for luminous transmittance and haze by use of an integrating-sphere-type light transmittance measuring apparatus in accordance with the method of JIS K 6714. The results obtained were as shown in Table 3. The said film showed very good transparency, whereas the film formed from the resin composition obtained in Referential Example 1-2, wherein ground calcium carbonate was used, was opaque. In order to evaluate the water resistance, a piece of film was immersed in boiling water (100° C.) for 40 hours and tested for tear strength to compare with that of a dry specimen.

REFERENTIAL EXAMPLE 3-1

A resin composition was prepared and evaluated in the same manner as in Example 3, except that the untreated powdered mineral obtained from the nepheline-syenite was used as such in place of the activated mineral filler.

REFERENTIAL EXAMPLE 3-2

The same high-density polyethylene as used in Example 3 was evaluated.

REFERENTIAL EXAMPLE 3—3

A resin composition was prepared and evaluated in the same manner as in Example 3, except that the treated calcium carbonate obtained in Referential Example 1-2, was used in place of the activated mineral filler (see West German Pat. Publication No. 2,262,126).

REFERENTIAL EXAMPLE 3-4

100 parts of chrysotile asbestos having a diameter of 0.025μ, a BET specific surface area of 30 m²/g, and a moisture content of 1.5% was heated in petroleum hydrocarbon at 120° to 130° C. To the heated mixture was added 10 parts of acrylic acid and it was agitated for one hour. The asbestos was collected by filtration, washed with benzene, and dried in vacuo at 130° C. By use of the treated filler thus obtained, a resin composition was prepared and evaluated in a manner similar to that described in Example 3 (see U.S. Pat. No. 3,304,197).

REFERENTIAL EXAMPLE 3-5

In a Henschel mixer, 100 parts of basic magnesium carbonate having an average particle diameter of 0.4μ, a BET specific surface area of 6.3 m²/g, and a moisture content of 2.1% and 4 part of acrylic acid were mixed at room temperature (20° C.) for 10 minutes. By use of the treated filler thus obtained, a resin composition was prepared and evaluated in a manner similar to that described in Example 3 (See U.S. Pat. No. 3,694,403).

TABLE 3

|  | Mechanical properties | | | | | | Optical properties | | Water resistance Tear strength* g | |
| --- | --- | --- | --- | --- | --- | --- | --- | --- | --- | --- |
|  | Tensile strength kg/cm² | Elongation % | Flexural strength kg/cm² | Flexural modulus kg/cm² | Izod impact strength kg . cm/cm | Fatigue strength kg/cm² | Luminous transmittance % | Haze % | 0 hr. | 40 hr. |
| Example 3 | 360 | 40 | 460 | 34000 | 46 | 210 | 87 | 29 | 200 | 283 |
| Referential Example 3-1 | 220 | 5 | 250 | 35000 | 3 | 50 | 86 | 31 | 70 | 60 |
| Referential Example 3-2 | 260 | >100 | 280 | 11000 | 38 | 60 | 87 | 35 | — | — |
| Referential Example 3-3 | 360 | 33 | 440 | 33000 | 46 | 150 | 27 | 93 | 170 | 140 |
| Referential Example 3-4 | 270 | 2 | 350 | 46000 | 6 | 80 | 31 | 89 | 60 | 40 |
| Referential Example 3-5 | 350 | 11 | 380 | 39000 | 12 | 100 | 86 | 23 | 110 | 50 |

Note:
*ASTM D 1938

EXAMPLE 4

Resin compositions were prepared and tested for physical properties in the same manner as in Example 3, except that various unsaturated organic acids as shown in Table 4 were used in place of acrylic acid in preparing the activated mineral filler, solid acids being mixed with the powdered mineral as a suspension or solution in ethanol.

The retention percent of unreacted ethylene double bond of the unsaturated organic acids in the resulting activated mineral fillers were as follows:

TABLE 4

| Example | Unsaturated organic acid | Retention % |
| --- | --- | --- |
| 4–1 | Methacrylic acid | 87 |
| 4–2 | Crotonic acid | 95 |
| 4–3 | Sorbic acid | 90 |
| 4–4 | Maleic acid | 92 |
| 4–5 | Itaconic acid | 90 |

TABLE 4a

|  | Organic acid | Tensile strength kg/cm² | Elongation % | Flexural strength kg/cm² | Flexural modulus kg/cm² | Izod impact strength kg . cm/cm |
| --- | --- | --- | --- | --- | --- | --- |
| Example 4-1 | Methacrylic acid | 310 | 11 | 350 | 34000 | 15 |
| Example 4-2 | Crotonic acid | 270 | 9 | 340 | 35000 | 11 |
| Example 4-3 | Sorbic acid | 300 | 16 | 370 | 34000 | 16 |
| Example 4-4 | Maleic acid | 270 | 8 | 340 | 35000 | 9 |
| Example 4-5 | Itaconic acid | 260 | 9 | 330 | 36000 | 10 |
| Referential Example 3-1 | — | 220 | 5 | 250 | 35000 | 3 |

EXAMPLE 5

Resin compositions were prepared and tested for physical properties in the same manner as in Example 3, except that various polyolefins as shown in Table 5 were used in place of high-density polyethylene.

REFERENTIAL EXAMPLE 5

Resin compositions were prepared and tested in the same manner as in Example 5, except that the untreated powdered mineral was used in place of the activated mineral filler.

The results obtained were as shown in Table 5.

TABLE 5

| | Polyolefin | Tensile Strength kg/cm$^2$ | Elongation % | Flexural strength kg/cm$^2$ | Flexural modulus kg/cm$^2$ | Izod impact strength kg . cm/cm |
|---|---|---|---|---|---|---|
| Example 5-1 | Low-density polyethylene | 145 | 48 | 210 | 5500 | 32 |
| Example 5-2 | Crystalline polypropylene | 410 | 9 | 630 | 41000 | 3.1 |
| Example 5-3 | Crystalline ethylene-propylene block copolymer | 300 | 12 | 490 | 32000 | 7.2 |
| Referential Example 5-1 | Low-density polyethylene | 120 | 12 | 170 | 5000 | 9 |
| Referential Example 5-2 | Crystalline polypropylene | 290 | 2 | 480 | 42000 | 1.7 |
| Referential Example 5-3 | Crystalline ethylene-propylene block copolymer | 230 | 4 | 350 | 30000 | 2.8 |

Note:
(1) Low-density polyethylene: MI 1.6; density 0.92
(2) Crystalline polypropylene: MFI 2.8; density 0.91
(3) Crystalline ethylene-propylene block copolymer: MFI 2.0; ethylene content 20%

EXAMPLE 6

A vinyl chloride resin composition was prepared by mixing in a Banbury mixer at 175° C. a mixture of the following formulation, wherein the activated mineral filler was that obtained in Example 2. The resulting composition was compression-molded to prepare test specimens which were tested for physical properties in the same manner as in Example 1.

| Formulation | Parts |
|---|---|
| Activated mineral filler | 200 |
| Polyvinyl chloride, polymerization degree 1050 (Geon 103 FP produced by The Japanese Geon Co.) | 100 |
| Dioctyl phthalate | 10 |
| Tricresyl phosphate | 20 |
| Chlorinated paraffin | 10 |
| Lead stearate | 1 |
| White lead | 2 |
| Dicumyl peroxide | 0.03 |

REFERENTIAL EXAMPLE 6

A resin composition was prepared and tested for physical properties in the same manner as in Example 6, except that the untreated powdered mineral was used as such in place of the activated mineral filler.

The results obtained were as shown in Table 6.

TABLE 6

| | Tensile strength kg/cm$^2$ | Elongation % | Flexural strength kg/cm$^2$ | Flexural modulus kg/cm$^2$ | Izod impact strength kg . cm/cm |
|---|---|---|---|---|---|
| Example 6 | 450 | 32 | 710 | 41000 | 4.2 |
| Refereantial Example 6 | 270 | 18 | 640 | 42000 | 3.2 |

EXAMPLE 7

The process of Example 2 was repeated except that in place of 500 ppm of hydroquinone there was substituted 0.15 part by weight of dicumyl peroxide. Analysis for the presence of double bonds indicated that the product, prior to admixture of the thermoplastic resin, had lost more than 90% of the double bonds initially present in the acrylic acid.

The mineral filler so activated was mixed with high-dinsity polyethylene as indicated in Example 3 and shaped articles were prepared and tested. Whereas the activated filler of Example 3 resulted in an Izod impact strain of 46 kg. cm/cm as shown in Table 3 on page 24, the Izod impact strength of the molding produced from the filler activated in the presence of dicumyl peroxide was less than 10 kg. cm/cm.

EXAMPLE 8

For comparison, 100 parts of nephelinesyenite used in Example 3, 5 parts of 1,3-butylene glycol dimethacrylate, 1 part of methacrylic acid and 0.12 part of 2,5-dimethyl-2,5-di(t-butylperoxy)hexyne-3 were mixed at room temperature for 30 minutes using the Henschel mixer used in Example 1.

To 50 parts of the filler thus treated, 50 parts of high-density polyethylene used in Example 3 was added and melt-mixed in a Banbury mixer at 220° C. for 3 minutes.

Physical properties of the resulting composition were measured and evaluated in the same manner as described in Example 3.

The results obtained were as set forth in Table 7.

TABLE 7

| | Mechanical properties | | | | | | Optical properties | | Water resistance Tear strength, g | |
|---|---|---|---|---|---|---|---|---|---|---|
| | Tensile strength kg/cm$^2$ | Elongation % | Flexural strength kg/cm$^2$ | Flexural modulus kg/cm$^2$ | Izod impact strength kg · cm/cm | Fatigue strength kg/cm$^2$ | Luminous transmittance % | Haze % | 0 hr. | 40 hr. |
| Comparison Experiment | 320 | 18 | 450 | 30000 | 18 | 140 | 85 | 31 | 160 | 200 |
| Example 3 | 360 | 40 | 460 | 34000 | 46 | 210 | 87 | 29 | 200 | 280 |

Reviewing the foregoing examples it can be seen that those procedures in accordance with the present invention inherently result in retention percents of unreacted ethylene double bonds of about 90% or higher, e.g. about 87 to 95% or even more.

The activated mineral filler of this invention can be incorporated in high concentrations into various thermoplastic resins and imparts to the resulting compounded composition excellently balanced physical properties such as strength, rigidity, impact resistance, heat resistance, etc. Moreover, it gives a compounded composition with markedly improved fatigue properties so that such a composition may be used in making functional mechanical elements such as gears, bearings, and the like, whereas a composition containing conventional mineral fillers has been looked upon as unsuitable. The present resin composition, in addition, is improved in the lowering of physical properties by absorption of water, which tendency is, in general, common to resin compositions containing conventional inorganic fillers in high concentrations.

Further, since many of the minerals suitable as a raw material for the present activated filler have refractive indices approximate to those of various thermoplastic resins, it is possible to select an activated mineral filler having the same refractive index as that of a thermoplastic resin so that the resulting compounded composition may have markedly improved transparency as well as excellently balanced physical properties.

As explained in the foregoing, the activated mineral filler of this invention can be manufactured easily and economically and has a wide application field.

It will be appreciated that the instant specification and examples are set forth by way of illustration and not limitation, and that various modifications and changes may be made without departing from the spirit and scope of the present invention.

What is claimed is:

1. A composition comprising a thermoplastic resin and an activated mineral filler, said mineral filler consisting of particles of at least one aluminosilicate-type mineral containing alkali metal ions as cations in its crystal structure, the surfaces of said particles being covered monomolecularly with at least one ethylenically unsaturated organic acid selected from the group consisting of acrylic acid, methacrylic acid, crotonic acid, sorbic acid, maleic acid and itaconic acid, said unsaturated organic acid being bonded to the metal ions on the surfaces of said particles while retaining a substantial portion of the ethylenic double bonds unreacted.

2. A composition according to claim 1, wherein the aluminosilicate-type mineral is a $K_2O$-$Al_2O_3$—$SiO_2$-type mineral, a $Na_2O$—$Al_2O_3$—$SiO_2$-type mineral or a $Li_2O$—$Al_2O_3$—$SiO_2$—type mineral.

3. A composition according to claim 1, wherein the aluminosilicate-type mineral is nepheline or orthoclase.

4. A composition according to claim 1, wherein the ethylenically unsaturated organic acid is acrylic acid or methacrylic acid.

5. A composition according to claim 1, wherein the thermoplastic resin is polyolefins, polyvinyl chlorides, polyvinylidene chlorides, polystyrenes, polymethyl methacrylates, polyamides, polyacetals, linear polyesters, polyurethanes, ABS resins, mixtures thereof with elastomers.

6. A composition according to claim 1, wherein the activated mineral filler content in the composition is 80% to 20% by weight.

7. A composition according to claim 1, wherein the powdered mineral has an average particle diameter of 0.01 to 50$\mu$.

8. A composition according to claim 1, wherein the ethylenically unsaturated organic acid is acrylic acid.

9. A composition according to claim 1, wherein the ethylenically unsaturated organic acid is methacrylic acid.

10. A composition according to claim 1, wherein the ethylenically unsaturated organic acid is crotonic acid, sorbic acid, maleic acid or itaconic acid.

11. A composition according to claim 1, wherein the aluminosilicate-type mineral is Masuda feldspar.

12. A composition according to claim 1, wherein the aluminosilicate-type mineral is nepheline-syenite.

13. A composition according to claim 1, wherein the aluminosilicate-type mineral is Masuda Feldspar and the ethylenically unsaturated organic acid is acrylic acid.

14. A composition according to claim 1, wherein the unsaturated organic acid retains about 87 to 95% of its ethylenic double bonds unreacted.

15. A composition according to claim 6, wherein the unsaturated organic acid retains about 90% of its ethylenic double bonds unreacted.

16. A composition according to claim 1, wherein the thermoplastic resin is polyolefins.

17. A composition according to claim 9, wherein the polyolefin is high-density polyethylene.

18. A process for producing a compounded composition, which is characterized by mixing the activated mineral filler defined in claim 1 with a thermoplastic resin and heating the resulting mixture to react.

19. A process according to claim 18, wherein a free-radical generating agent selected from organic peroxides, azo compounds or organotin (IV) compounds is used in mixing and reacting, under application of heat, the activated mineral filler with the thermoplastic resin.

20. A process according to claim 18, wherein the ethylenically unsaturated organic acid containing a polymerization inhibitor is used.

21. A process for producing a composition of claim 1 which comprises reacting particles of at least one aluminosilicate-type mineral containing alkali metal ions as cations in its crystal structure with at least one ethylenically unsaturated organic acid selected from the group consisting of acrylic acid, methacrylic acid, crotonic acid, sorbic acid, maleic acid and itaconic acid in the presence of an inhibitor, to prepare an activated mineral filler which has strong bonds between the unsaturated organic acid and the metal ions on the surface of said mineral paticles while retaining a substantial portion of the ethylenic double bonds unreacted, at a temperature of 50° to 200° C., and mixing said activated mineral filler with a thermoplastic resin.

22. A process according to claim 21, wherein the unsaturated organic acid retains about 87 to 95% of its ethylenic double bonds unreacted.

23. A process according to claim 21, wherein the unsaturated acid is acrylic acid and retains about 90% of its ethylenic double bonds unreacted.

* * * * *

UNITED STATES PATENT AND TRADEMARK OFFICE
CERTIFICATE OF CORRECTION

PATENT NO. : 4,242,251
DATED : Dec. 30, 1980
INVENTOR(S) : Itsuho Aishima et al

It is certified that error appears in the above—identified patent and that said Letters Patent is hereby corrected as shown below:

Col. 14, line 50 Delete "6" and insert --4--.

Col. 14, line 55 Delete "9" and insert --16--.

Signed and Sealed this

Twenty-third Day of June 1981

[SEAL]

Attest:

RENE D. TEGTMEYER

Attesting Officer        Acting Commissioner of Patents and Trademarks